(12) United States Patent
Loven

(10) Patent No.: US 11,998,825 B2
(45) Date of Patent: Jun. 4, 2024

(54) LIFTING AND TRANSPORTING ASSEMBLY FOR LIFTING AND TRANSPORTING A GOAL

(71) Applicant: Net World Sports Limited, Wrexham (GB)

(72) Inventor: Alexander Loven, Wrexham (GB)

(73) Assignee: Net World Sports Limited, Wrexham (GB)

( * ) Notice: Subject to any disclaimer, the term of this patent is extended or adjusted under 35 U.S.C. 154(b) by 451 days.

(21) Appl. No.: 17/290,022

(22) PCT Filed: Oct. 30, 2019

(86) PCT No.: PCT/GB2019/053076
§ 371 (c)(1),
(2) Date: Apr. 29, 2021

(87) PCT Pub. No.: WO2020/089624
PCT Pub. Date: May 7, 2020

(65) Prior Publication Data
US 2022/0001258 A1    Jan. 6, 2022

(30) Foreign Application Priority Data

Oct. 31, 2018 (GB) ..................... 1817826
Apr. 12, 2019 (GB) ..................... 1905241

(51) Int. Cl.
*A63B 71/00* (2006.01)
*A63B 63/00* (2006.01)
(Continued)

(52) U.S. Cl.
CPC ........ *A63B 71/0036* (2013.01); *A63B 71/023* (2013.01); *B65G 7/04* (2013.01);
(Continued)

(58) Field of Classification Search
CPC . A63B 71/0036; A63B 71/023; A63B 63/004; A63B 63/008; A63B 63/083; A63B 2071/025; B65G 7/04; B60B 33/066
See application file for complete search history.

(56) References Cited

U.S. PATENT DOCUMENTS 2,292,109 A * 8/1942 Engel ..................... A63B 63/00
473/421
5,407,211 A     4/1995 Bottiglieri
(Continued)

FOREIGN PATENT DOCUMENTS

CN    105770205 A    7/2016
CN    105771205 A    7/2016
(Continued)

OTHER PUBLICATIONS

International Search Report and Written Opinion filed in PCT/GB2019/053076; dated Jun. 23, 2020; 16 pages.

*Primary Examiner* — James A Shriver, II
*Assistant Examiner* — Nicholas R. Kandas
(74) *Attorney, Agent, or Firm* — Vedder Price P.C.

(57) ABSTRACT

An assembly for lifting and transporting sports equipment, such as a goal. The assembly 100 can be fitted to numerous variations of sports equipment 200 to enable both lifting of the sports equipment and horizontal transportation thereof.

16 Claims, 10 Drawing Sheets

(51) Int. Cl.
    *A63B 63/08*     (2006.01)
    *A63B 71/02*     (2006.01)
    *B60B 33/06*     (2006.01)
    *B65G 7/04*     (2006.01)

(52) U.S. Cl.
    CPC ........... *A63B 63/004* (2013.01); *A63B 63/008* (2013.01); *A63B 63/083* (2013.01); *A63B 2071/025* (2013.01); *B60B 33/066* (2013.01)

(56) References Cited

U.S. PATENT DOCUMENTS

| | | | |
|---|---|---|---|
| 8,029,413 B2 * | 10/2011 | Law | A63B 71/023 |
| | | | 482/28 |
| 2007/0023589 A1 * | 2/2007 | Kaczorowski | B60B 33/0068 |
| | | | 248/129 |
| 2010/0029416 A1 * | 2/2010 | Lindstrom | A63B 63/004 |
| | | | 473/477 |
| 2023/0123730 A1 * | 4/2023 | Downing | |

FOREIGN PATENT DOCUMENTS

| | | |
|---|---|---|
| DE | 29802505 U1 | 4/1998 |
| WO | WO 2018121038 A1 * | 7/2018 |
| WO | WO-2018121038 A1 * | 7/2018 |

\* cited by examiner

LIFTING AND TRANSPORTING ASSEMBLY FOR LIFTING AND TRANSPORTING A GOAL

The present invention relates to a lifting and transporting assembly for lifting and transporting sports equipment such as a goal.

It is important to be able to manoeuvre sporting equipment to diverse locations easily, safely and efficiently. Lifting of the sports equipment can be dangerous and manoeuvring can be difficult due to directional restrictions in wheel movement. The limitations of manoeuvrability and lifting can place excess strain on the sports equipment, which may lead to damage and an overall reduced product life span. Furthermore, current models require several operators to allow transport. The linear design of existing assemblies intended to assist transportation limits the application to the corresponding ends of the sports equipment whilst also limiting the movement to linear directions and increased arching turning circle. Variations in terrain can also have a resounding effect on its ability to function with an increased risk of immobilisation. Lifting and lowering of the sports equipment needs to be done in a safe manner and has to involve the minimum number of operators as possible.

It is therefore an object of the present invention to overcome and/or alleviate one or more of the technical problems mentioned above.

In accordance with a first aspect of the present invention, there is provided a lifting and transporting assembly for lifting and transporting a sports equipment having one or more frame members, the assembly comprising: an elongate arm having a first end and second end; a wheel coupled with the first end of the elongate arm; a coupling member for coupling the assembly with a frame member of the sports equipment, the arm being pivotally coupled with the bracket about a fulcrum; locking means configured to lock the arm relative to the coupling member; wherein the arm is pivotable between: a first configuration, in which the elongate arm is orientated substantially horizontally, and a second configuration in which the elongate arm is orientated substantially vertically; and wherein, in use, the arm is arranged to pivot about the fulcrum such that in the first configuration, the wheel is positioned above a lower portion of the frame member for lowering the sports equipment onto the ground, and in the second configuration, the wheel is positioned below the lower portion of the frame member for lifting and transporting the sports equipment; and wherein the arm is lockable in the second configuration using the locking means.

In an embodiment, the elongate arm comprises a retractable handle.

In an embodiment, the retractable handle comprises a proximal end and distal end, wherein the proximal end of the handle is pivotally coupled with the second end of the elongate arm.

In an embodiment, the retractable handle is pivotable between a storage configuration, in which the retractable handle extends substantially along the length of the elongate arm, and an operative configuration, in which the retractable handle extends along the longitudinal axis of the elongate arm and away therefrom.

In an embodiment, the wheel comprises a swivel caster wheel extending axially away from the elongate arm.

In an embodiment, the coupling member may comprise a bracket and/or sleeve.

In an embodiment, the bracket is shaped so as to define a cavity adapted to receive the frame member.

In an embodiment, the bracket comprises a rigid beam having a first wall coupled to a second wall so as to define an L-shaped cross-section of the beam, wherein the first wall is pivotally coupled to the side wall of the elongate arm, and the second wall is detachably couplable with the frame member.

In an embodiment, the second wall comprises a male connector adapted to detachably couple with a female connector disposed along the frame member.

In an embodiment, the second wall comprises a female connector adapted to detachably couple with a male connector disposed along the frame member.

In an embodiment, the beam is arranged to receive the frame member.

In an embodiment, the sleeve may comprise a sleeve body having an aperture extending therethrough for receiving a frame member of the sports equipment.

The sleeve may comprise an elongate, hollow cylindrical body.

The aperture of the sleeve may be complementarily shaped with respect to the frame member of the sports equipment to provide improved coupling.

The coupling member may be releasably secured to the frame member of the sports equipment.

In an embodiment, the coupling member comprises a slide received in a track disposed on a frame member of the sports equipment.

The slide may comprise a planar body having a male connector extending therefrom to be received by female connector disposed in a frame member of the sports equipment.

In an embodiment, the coupling member may be releasably securable in a desired location on a frame member of the sports equipment by means of securing means.

In an embodiment, the securing means comprises one or more securing members. The securing members may comprise one or more fasteners.

In an embodiment, the locking means comprises a pin insertable into an aperture located in the bracket and simultaneously into an aperture located in the side wall of the elongate arm when the aperture in the bracket and the aperture in the side wall of the arm are aligned.

The sports equipment may be a goal. The goal may be for use in any sport, including football, field hockey, lacrosse, handball, basketball, rugby, soccer and the like.

In accordance with a second aspect of the present invention, there is provided a transportation system for transporting sports equipment, comprising a plurality of the assemblies according the first aspect.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings, in which.

Figure 10:
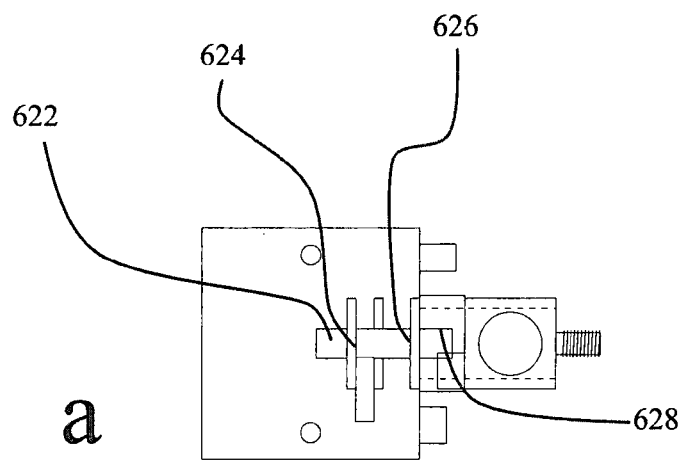
Figure 10:
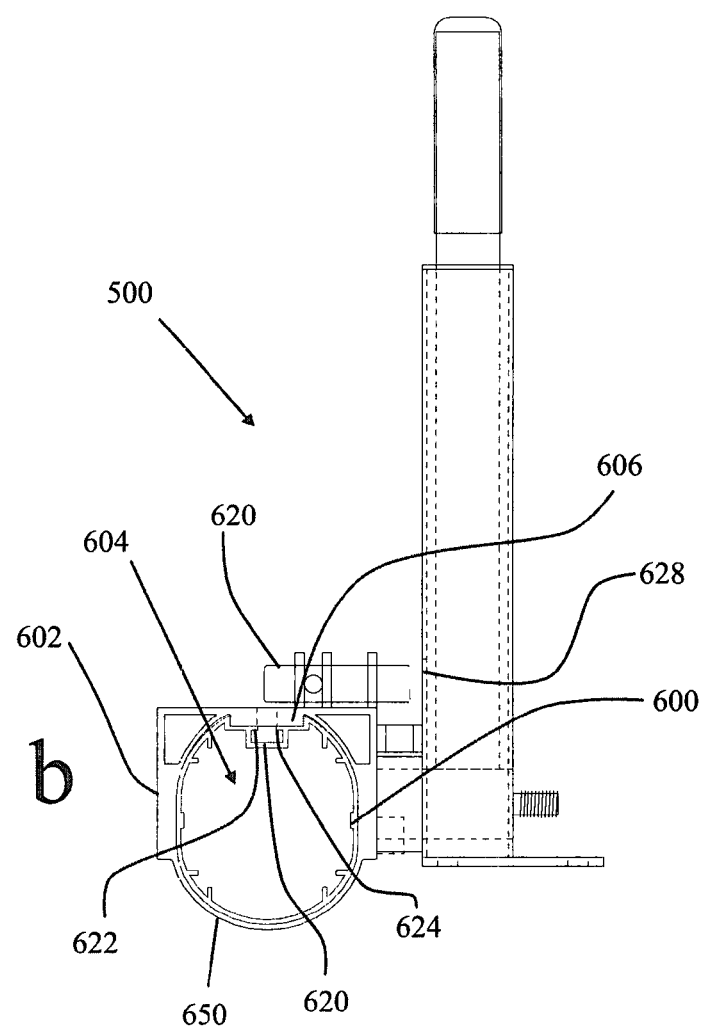
Figure 10:
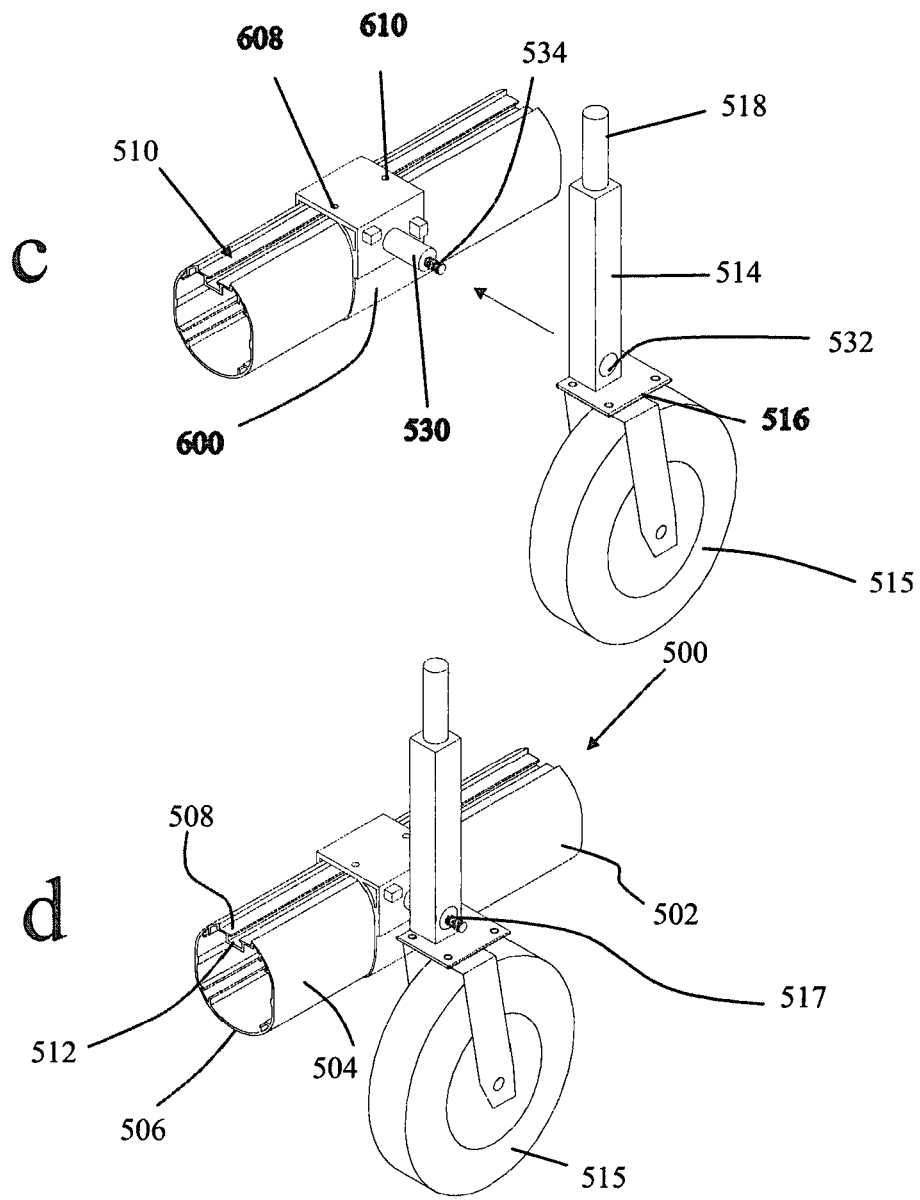
Figure 11:
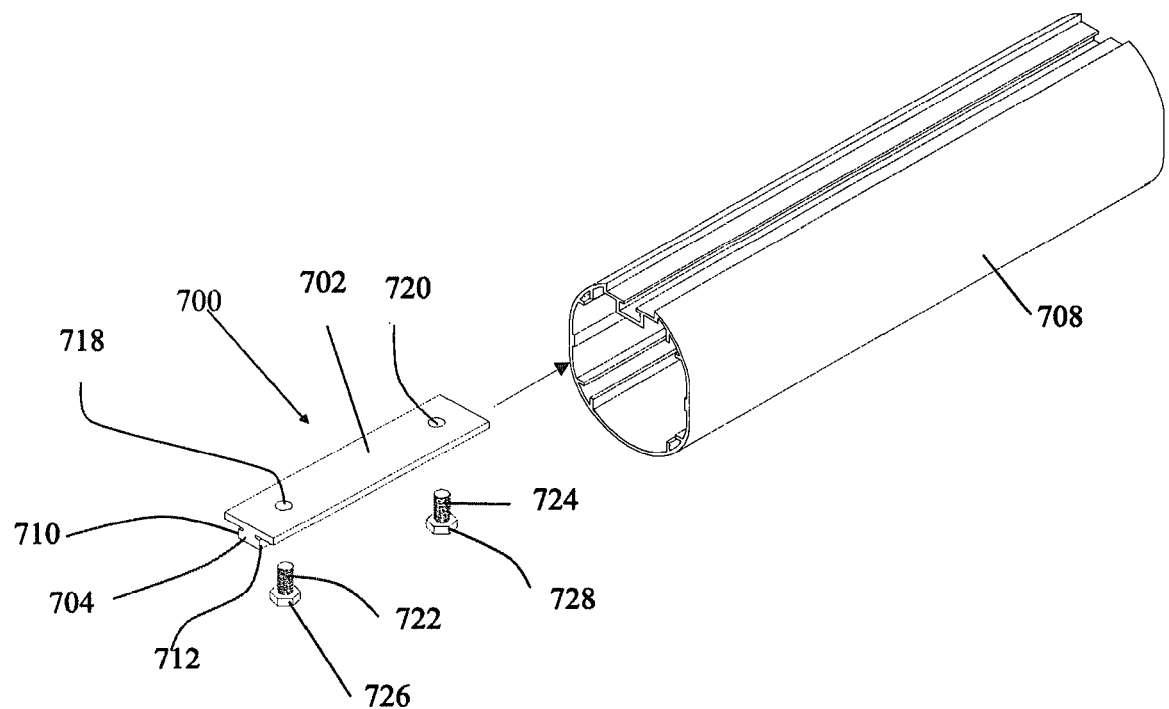
Figure 11:
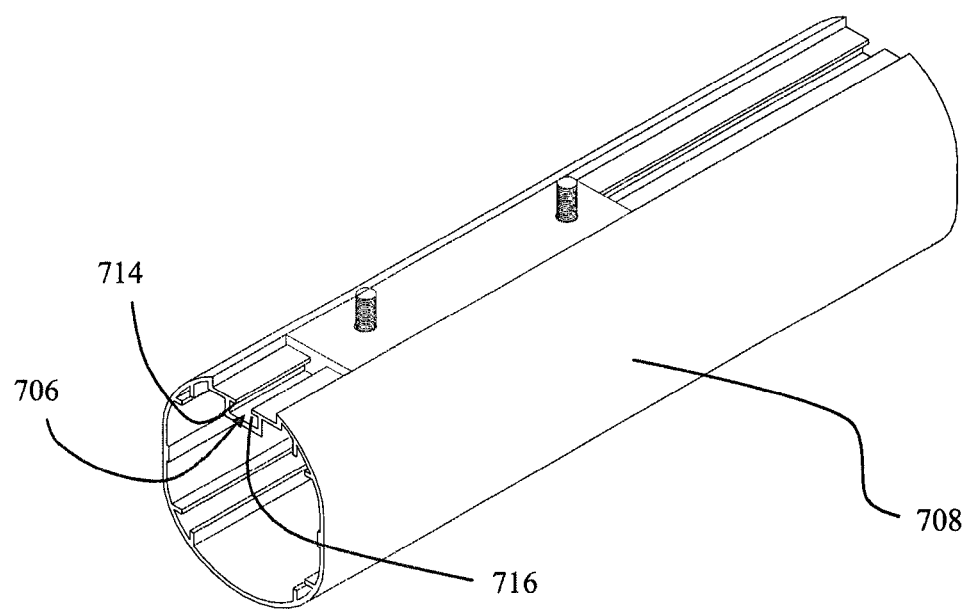

FIGS. 10 a to d show an alternative embodiment in accordance with the present invention having a sleeve for receiving an element of a goal; and FIGS. 11 a and b show an alternative embodiment in accordance with the present invention having a coupling member comprising a slide received by a frame member of a goal.

Figure 1:
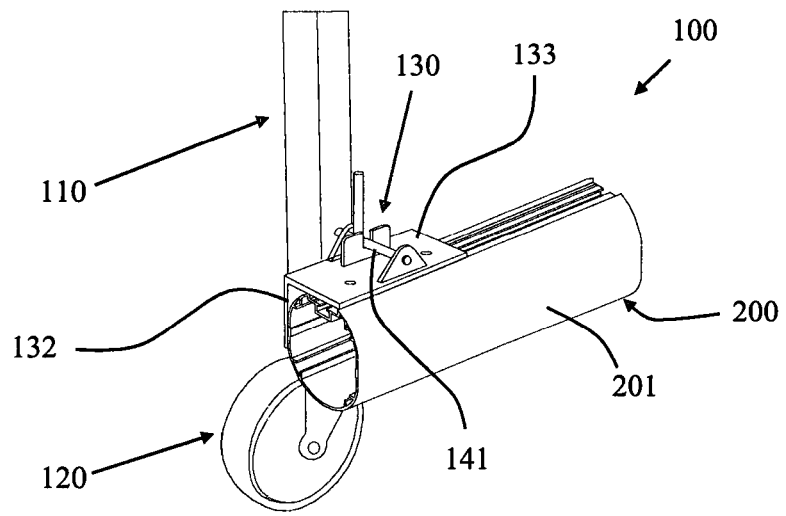
FIG. 1 shows a perspective view of an assembly according to an embodiment of the present invention, in a second configuration.
Figure 2:
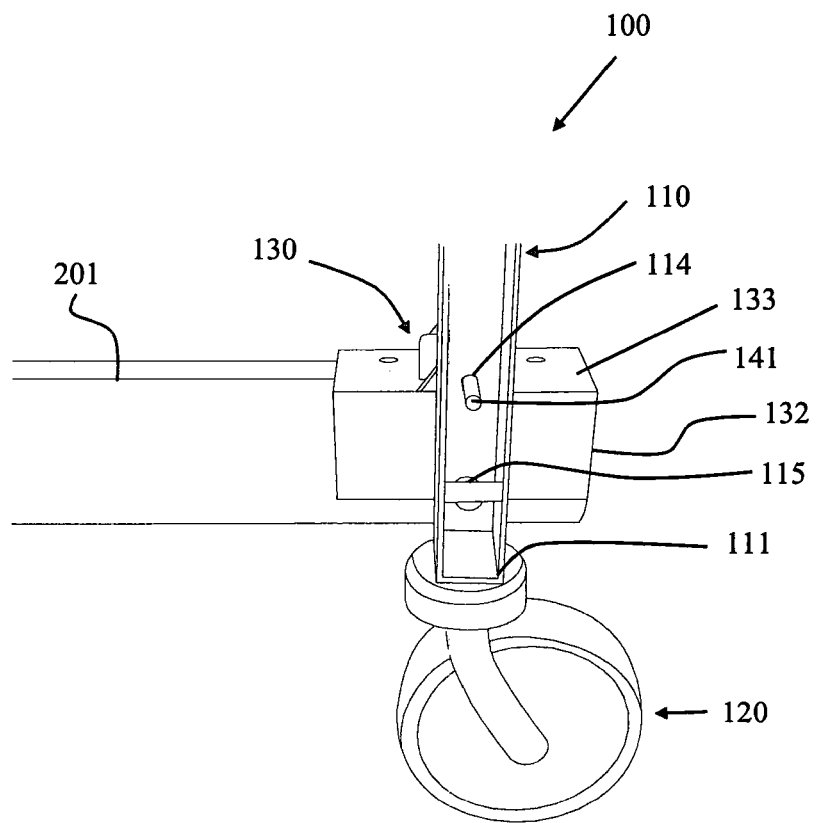
FIG. 2 shows a side view of the assembly of FIG. 1.

FIG. 1 shows an assembly for lifting and transporting a football goal, such as a sports equipment 200 including goal posts 200. The assembly 100 can be fitted to numerous variations of sports equipment 200 to enable both lifting of the sports equipment and horizontal transportation thereof.

The assembly 100 comprises an elongate arm 110 having a first end 111 and second end 112. The arm 110 may comprise a hollow metal beam 110 for example.

The assembly 100 further comprises a wheel 120 coupled with the first end 111 of the elongate arm 110. The wheel 120 may comprise a 360° swivel castor 120 or any other wheel allowing rolling movement in all directions. The wheel 120 may be mounted so as to extend axially away from the arm 110 such that the longitudinal axis of the arm 110 extends substantially parallel to a plane defined by the wheel 120. The wheel 130 may also be locked in place by a suitable mechanism which will prevent rotation thereof. The wheel 130 is thereby lockable into place which as a result, enables an individual operator to freely manoeuvre the sports equipment 200 with a reduced turning circle as they desire across different types of terrain, including but not limited to grass, artificial surfaces, concrete, tarmac, wood, sand and the like.

Figure 7:
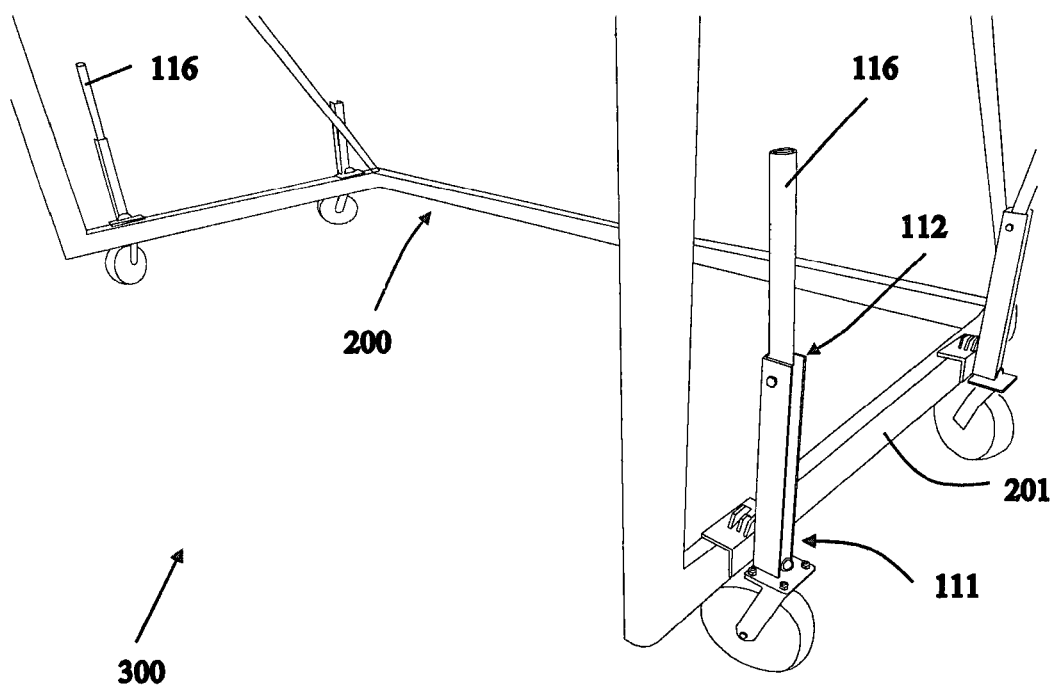
FIG. 7 shows a transportation system having a plurality of assemblies of FIGS. 1 to 6, coupled to a goal post, according to an embodiment of the present invention.

The assembly 100 further comprises a bracket 130 pivotally coupled with a side wall 113 of the elongate arm 110 proximate the first end 111. The bracket 130 may comprise a shaft 137 insertable into an opening 115 in the side wall 113 such that the shaft 137 defines an axis of rotation of the bracket 130. The axis of rotation of the shaft 137 extends substantially perpendicularly to the longitudinal axis of the arm 110. The bracket 130 may comprise a buckle or clamp adapted to engage and hold a frame member 201, such as a horizontal bar 201, of the goal post 200 (FIG. 7). The bracket 130 may be shaped so as to define a cavity 131 adapted to receive the frame member 201 of the football goal 200. The bracket 130 may comprise a rigid beam 130 having a first wall 132 coupled to a second wall 133 so as to define an L-shape or L-shaped cross-section of the bracket 130 or beam 130, wherein the first wall 132 is pivotally coupled to the side wall 113 of the elongate arm 110, and the second wall 133 is detachably couplable with the frame member 201 of the post 200. The first wall 132 may extend substantially parallel to the longitudinal axis of the arm 110, whereas the second wall 133 may extend substantially perpendicularly to the longitudinal axis of the arm 110. The second wall 133 may comprise a male connector 134 adapted to detachably couple with a female connector 202 disposed along the frame member 201 of the post 200. Alternatively, the second wall 133 may comprise a female connector (not shown) adapted to detachably couple with a male connector (not shown) disposed along the frame member 201 of the post 200. The L-shaped beam 130 may be arranged to receive the horizontal frame member 201 of the post 200, for example, but may also be pivoted so as to receive a vertical frame member 203.

The assembly 100 further comprises a locking means 140 configured to lock the bracket 130 relative to the elongate arm 110. The locking means 140 may comprise a pin 141 configured to immobilise the bracket 130 relative to the elongate arm 110, wherein the pin 141 is insertable into an aperture 135 disposed within a first support 138 positioned on a second wall 133 of the beam 130, and into an aperture 136 disposed within the second support 139 positioned on a second wall 133, and simultaneously into an aperture 114 located in the side wall 113 of the elongate arm 110, when the apertures 135, 136 and 114 are aligned.

The arm 110 is pivotable between a first configuration, in which the elongate arm 110 is orientated substantially horizontally, and a second configuration in which the elongate arm 110 is orientated substantially vertically.

Figure 3:
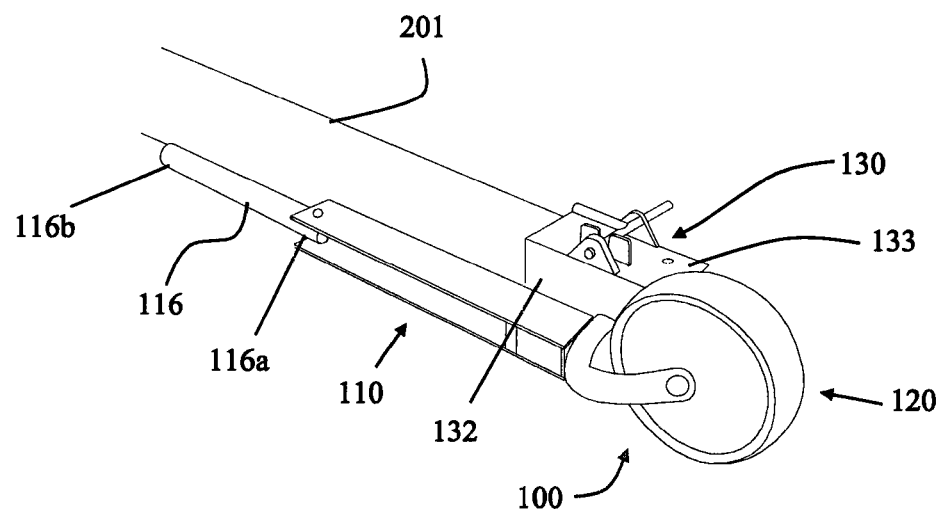
FIG. 3 shows a perspective view of an assembly of FIGS. 1 to 2 in a first configuration.
Figure 4:
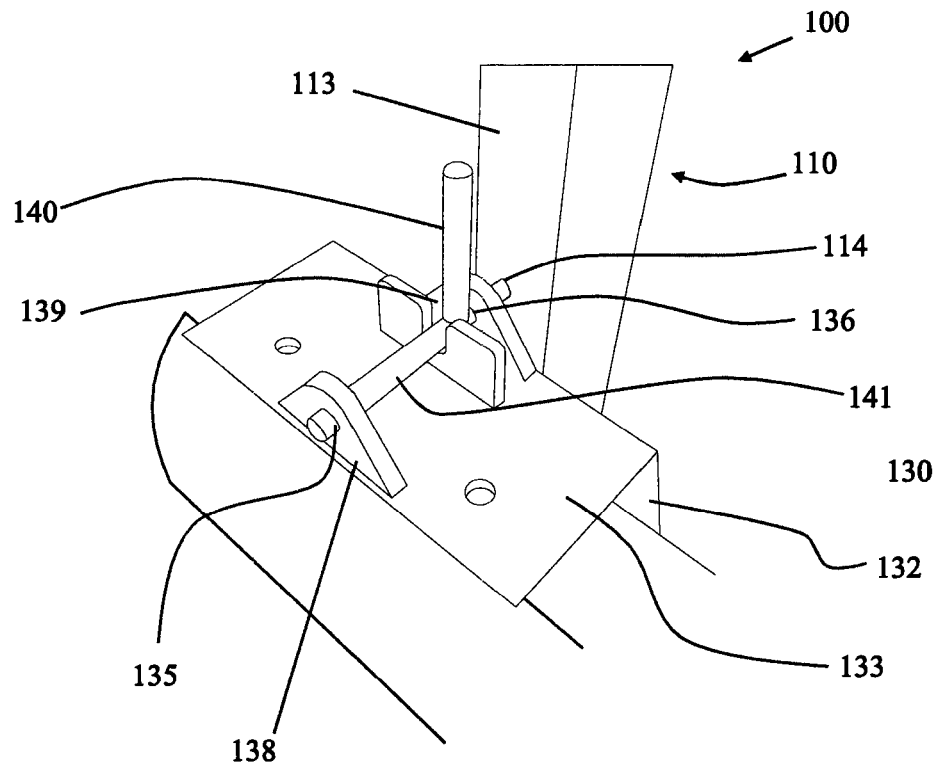
FIG. 4 shows a perspective view of a bracket and arm of an assembly of FIGS. 1 to 2 in a second configuration.
Figure 5:
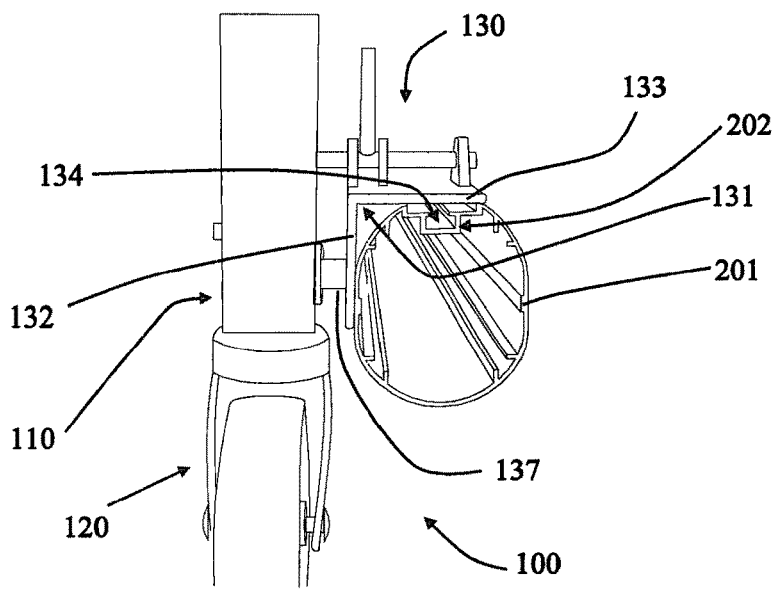
FIG. 5 shows another side view of the assembly of FIGS. 1 and 2.
Figure 6:
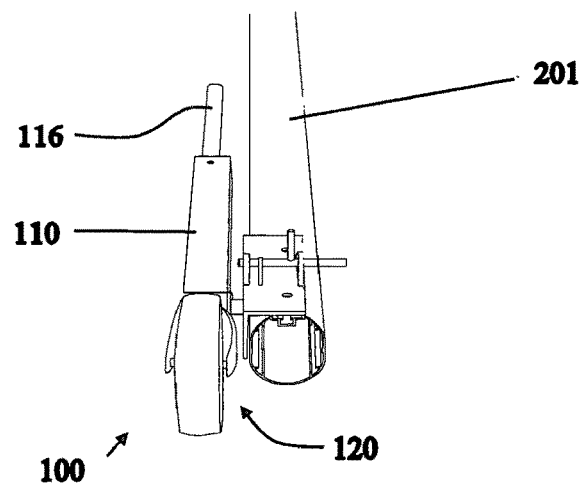
FIG. 6 shows another perspective view of the assembly of FIG. 3.

In use, the arm 110 is arranged to pivot about the fulcrum such that in the first configuration, the wheel 120 is positioned above a lower portion 201a of the frame member 201 for lowering the goal 200 onto the ground (FIGS. 3 and 6), and in the second configuration, the wheel 120 is positioned below the lower portion 201a of the frame member 201 for lifting and transporting the goal 200 (FIGS. 1, 2, 4, 5, 7); and wherein. The arm 110 is lockable in the second configuration using the locking means 140 for facilitating substantially horizontal movement of the goal post 200.

The elongate arm 110 may further comprise a retractable handle 116. The retractable handle 116 may comprise a proximal end 116a and distal end 116b, wherein the proximal end 116a of the handle 116 is pivotally coupled with the second end 112 of the elongate arm 110. The retractable handle 116 may be pivotable between a storage configuration, in which the retractable handle 116 10 extends substantially along the length of the elongate arm 110, and an operative configuration, in which the retractable handle 116 extends along the longitudinal axis of the elongate arm 110 and away therefrom.

The assembly 100 can be operated as follows. An individual operator may position the assembly 100 horizontally along a ground-engaging frame member or bar 201 of a football goal post 200 for example. In this orientation, the bracket 130 may pivot relative to the arm 110 so that the cavity 131 may receive the bar 201 and the bracket 130 can be coupled to the ground-engaging bar 201 by connecting the male connector 134 with the female connector 202 and/or by using a nut and bolt for example. Alternative ways of fastening the assembly 100 to the post 200 are also possible. Once the assembly 100 is securely fastened to the bar 201, the operator may repeat the process with further assemblies 100 which are going to be secured to the post 200 at different locations, for example at further ground-engaging frame members, so that the entire post 200 can be lifted completely of the ground. Once the bracket 130 is locked to the member 201, the operator can then extend the handle 116 into the operative position. In this way, the handle can be gripped by the operator and lifted upwards, which will then translate into levering force acting on the post 200. Pivoting the arm 110 via the handle 116 from the horizontal position into vertical position will lift at least a portion of the post 200 associated with the assembly off the ground and reposition the wheel 120 from above the lower portion 201a of the frame member to a position below the lower portion 201a of the frame member, such that the wheel 120 will now engage the ground and thereby provide support for the post 200. The locking pin 141 may now be slid into the aperture 114 which will immobilise the bracket 130 relative to the arm 110. The above process can be repeated with the other assemblies until the entire post 200 is lifted completely of the ground. When all the assemblies locked in this way, then the post 200 may be safely rolled into another location. When in a desired location, the pin 141 may then be retracted back into unlocked position. The assembly 100 may then be safely lowered to the ground by pivoting the arm 110 or handle 116 from the vertical orientation into horizontal orientation. In this way, the wheel 120 moves from the position below the lower portion 201a of the frame member 201 into the position above the lower portion 201a of the frame member 201. The arrangement of the assemblies 100 is illustrated on FIG. 7 which shows a transportation system 300 for transporting sports equipment 200, comprising a plurality of the assemblies 100 according to the present invention.

Figure 8:
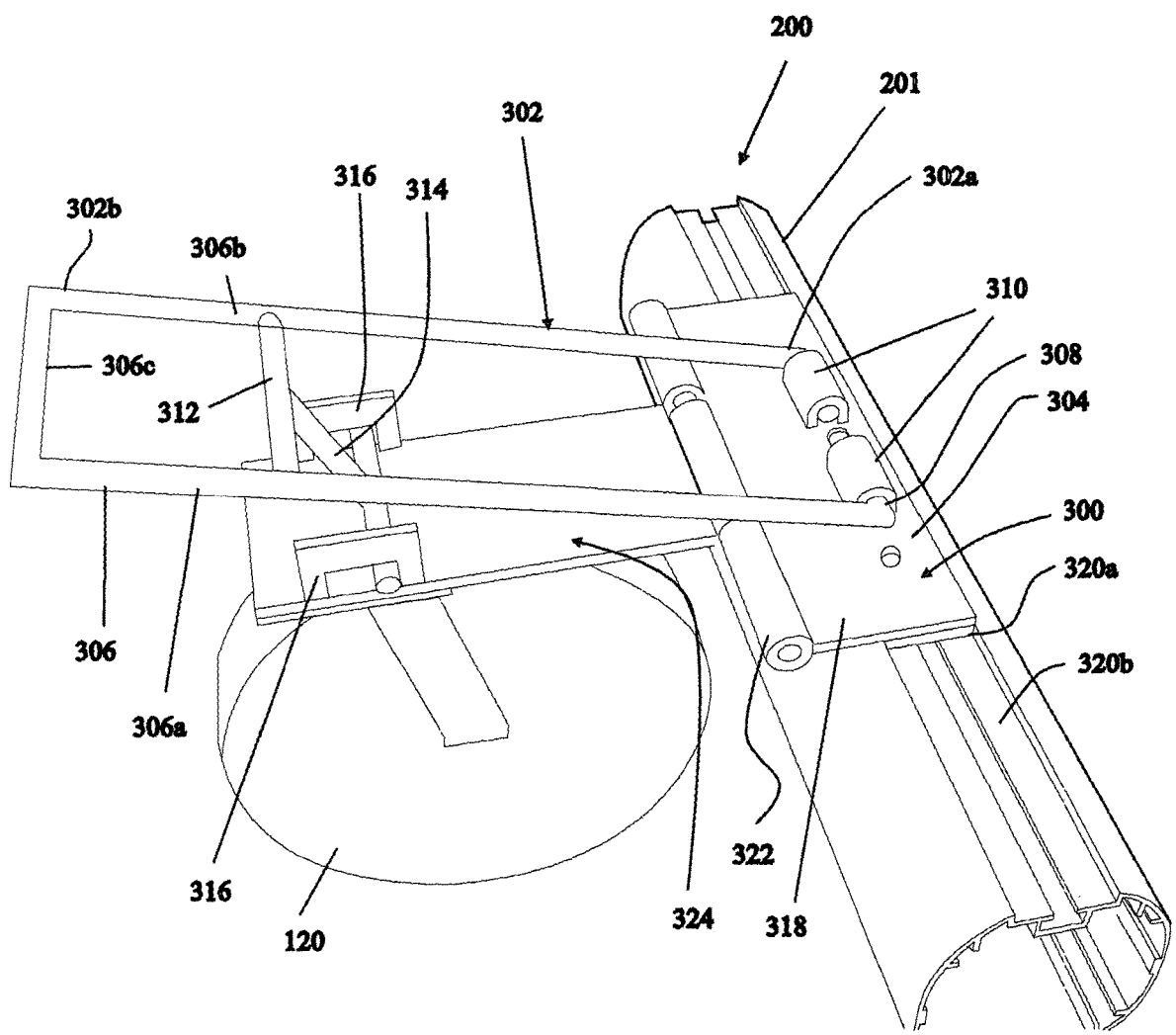
FIG. 8 shows a perspective view of an assembly according to a second embodiment of the present invention.

Referring to FIG. 8 there is illustrated a lifting and transporting assembly according to a second embodiment of the present invention. The assembly of this second embodiment can be fitted to a variety of sports equipment, including a goal frame 200 for example. The assembly 300 is couplable to a frame member 201 of the goal frame for lifting and transporting the frame. The assembly 300 comprises an elongate lever 302 having a first end 302a and second end 302b. The elongate lever 302 may comprise a foot operated lever.

The lever 302 is pivotally coupled at the first end 302a thereof to a bracket 304 mountable upon a frame member 201 of the goal frame. The lever 302 comprises a generally rectangular frame 306, with substantially parallel left and right frame members 306a, 306b and a conjoining frame member 306c at the second end 302b defining a rectangular planar surface. The frame 306 is pivotally coupled at the first end 302a to the bracket 304 by a pair of frame feet 308, which extend through over-moulded fixings 310. The lever 302 is pivotable about the frame feet 308 about an axis which is substantially parallel to the frame member 201.

Toward the second end 302b of the lever 302 there is a cross beam 312 which extends between the left and right frame members 306a, 306b. The cross beam 312 additionally comprises a coupler 314 having a substantially inverted T-shape. The coupler is coupled at an upper end to a central portion of the cross beam 312, and opposite sides of the lower end of the T-shape coupler 314 extend through gates 316 disposed upon an upper side of a wheel plate 324, at a distal end thereof. The gates 316 are sized such that the lower end of the T-shape coupler 314 can both slide along the wheel plate 324 and rotate relative to the plate 324. The assembly further comprises a wheel 120 which extends from an underside of the wheel plate 324.

The bracket 304 comprises a substantially rectangular plate 318 having a male connector 320a formed on the underside thereof, which is insertable into a female connector channel 320b disposed along the frame member 201 for securing the bracket 304 to the frame member 201. The male connector 320a is shaped such that it can only be inserted/removed into/from the channel 320b by sliding the male connector 320a along the frame member 201; the male connector 320a is restricted from relative vertical separation by virtue of the interlocking arrangement of the male and female connections.

The wheel plate 324 is also pivotally attached at a proximal end thereof to the bracket 304 by means of a hinge 322, such that the wheel plate 324 and thus the wheel 120 can pivot about the hinge 322 so that the wheel can be re-positioned above and below a lower portion of the frame member 201. The wheel plate 324 is further coupled with the lever 302 via the T-shaped coupler 314 and the wheel 120 is coupled at the underside of the wheel plate 324 toward the distal end thereof, by means of a 3600 swivel castor for example, or any other means of wheel attachment which allows movement in all directions.

The assembly 300 and particularly the wheel is reconfigurable between a first (raised) configuration and a second (lowered) configuration. During use, an operator can reconfigure the assembly 300 from the first to the second configuration by applying a downward force upon the lever 302, at the distal end of the lever 302. Upon applying a downward force to the lever 302, the lever 302 will rotate about the frame feet 308 urging the lower end of the coupler toward the bracket 304 and thus the frame member 210. However, during this movement, the lower end of the coupler 314 will abut the gate. By applying a further downward force, the abutment of the coupler with the gate will cause the frame member 201 to lift, effectively pivoting about the distal end of the coupler and at the same time, the wheel is arranged to pass underneath the frame member 201 and move from one side of the frame member to the other side. However, the extent to which the wheel extends underneath the frame member is limited by the contact of the lever 302 upon the hinge 322, and in the second configuration, in which the lever 302 contacts the hinge 322, the wheel 120 is arranged to extend to the other side of the frame member 201, beyond the centre position and therefore adopt a stable configuration by virtue of the weight of the frame member 201 holding the wheel 120 in this over-centre position.

In order to reconfigure the assembly to the first configuration, an operator simply pulls upwards upon the distal end of the lever. This action causes the lower end of the coupler 314 to slide along the wheel plate until it abuts the opposite side of the gate 316. Further upward force upon the lever 302 causes the wheel plate 324 and thus the wheel 120 to move back underneath the frame member 201, beyond the centre position, so that the frame can be lowered to the ground.

Figure 9:
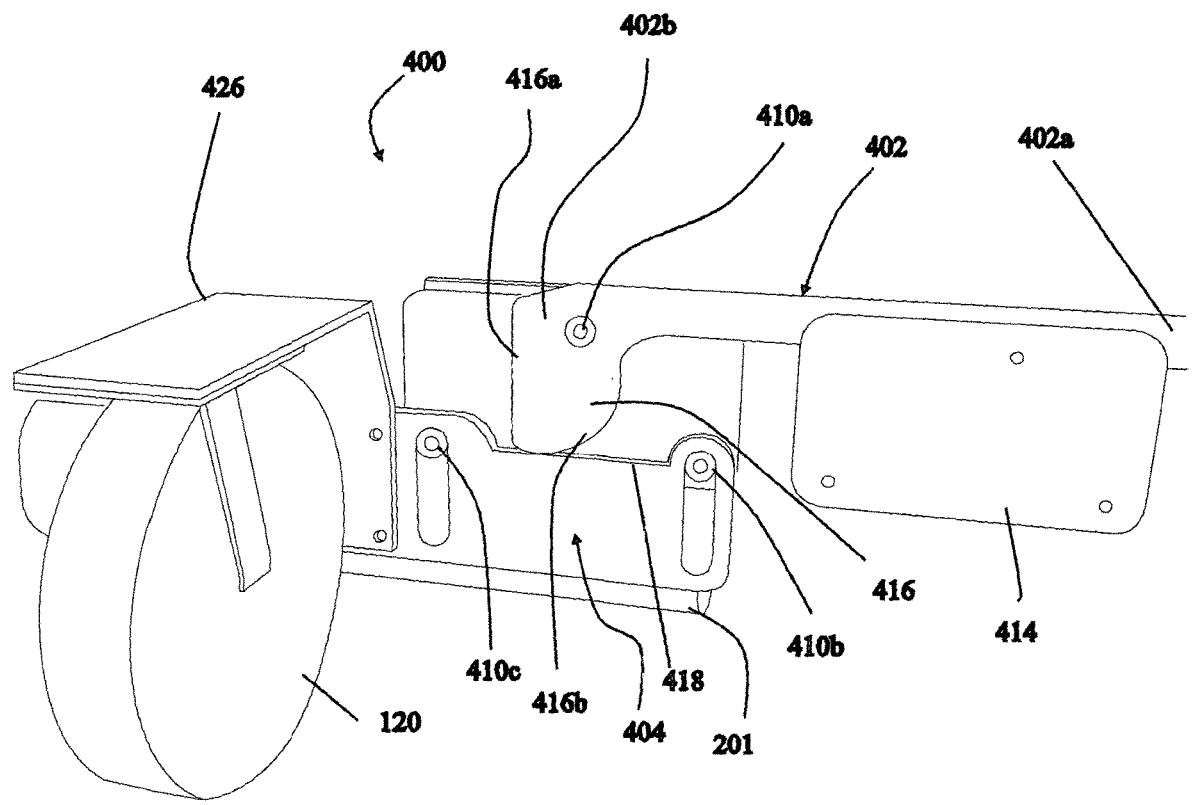
FIG. 9 shows a perspective view of an assembly according to a third embodiment of the present invention.

Referring to FIG. 9 of the drawings, there is illustrated an assembly 400 for lifting and transporting a frame according to a third embodiment of the present invention. The assembly 400 of the third embodiment can be fitted to a variety of goal frames, including a football goal, for example. The assembly 400 is couplable to a frame member 201 of the goal frame for lifting and transporting the frame. The assembly 400 comprises an elongate lever 402 having a first 402a end and a second end 402b, and a lifting mechanism 404 coupled to the lever 402. The elongate lever 402 may be a cam lever.

The assembly 400 additionally comprises a substantially L shaped bracket (not shown) for attaching the assembly 400 to a frame member 201 of the goal frame. The bracket comprises a first portion which is arranged to extend over an upper region of the frame member 201 and a second portion which in use extends downwardly from the first portion, and which is arranged to extend adjacent a side of the frame member 201.

The lifting mechanism comprises an actuation plate which is disposed between the second portion of the bracket and a backing plate. The actuation plate is arranged to slide in a substantially vertical direction, relative to the second portion of the bracket and the backing plate, in dependence of a rotational state of the lever 402 about a pivot pin 410*a*. The orientation of the actuation plate relative to the second portion of the bracket is maintained by further pins 410*b* and 410*c* which extend through respective elongate slots disposed within the actuation plate.

The pins 410*a-c* couple the backing plate to the second portion of the bracket, and are configured to a triangular configuration with the first pin 410*a* is disposed uppermost in the lifting mechanism 404. The first pin 410*a* provides a fulcrum about which the lever 402 can rotate to effect the relative positioning of the actuation plate between the second portion of the bracket and the backing plate.

The first portion of the bracket 402 comprises a male connector (not shown) disposed at an underside thereof which is insertable into a female connector channel (not shown) formed along the frame member 201 for securing the bracket 406 to the frame member when in use. The male connector is shaped such that it can only be inserted/removed from the female connector by sliding the male connector along into the channel; the male connector is restricted from relative vertical separation by virtue of the interlocking arrangement of the male and female connections.

The lever 402 has a first end 402*a* and second end 402*b*. The first end 402*a* of the lever 402 comprises a handle region, which can be gripped by an operator in order to operate the assembly 400. The second end 402*b* of the cam lever 402 comprises a head 416. The cam head 416 is comprised of a first flat region 416*a*, and a second rounded region 416*b*. The second region 416*b* extends further from the axis of rotation of the lever than the first region 416*a*. An edge of the cam head 416 is arranged to abut an upper edge of the actuation plate. When the lever 402 is rotated by the operator, the cam head 416 abutting the edge of the actuation plate exerts a force on the actuation plate causing the plate to move relative to the second portion of the bracket and the backing plate.

The assembly of the third embodiment similarly comprises a wheel 120 which is coupled to the actuation plate via a wheel bracket 426. The wheel 120 is attached to the wheel bracket 426 by means of a 360° swivel castor for example, or any other means of wheel attachment which allows movement in all directions. The wheel 120 is attached to the underside of the wheel bracket 426 when the assembly 400 is oriented for use.

In use the lever 402 is rotated from a first position to a second positon to transfer the assembly 400 from a first configuration to a second configuration. When the lever 402 is in a first position, the flat region 416*a* of the cam head 416 is engaged with the upper edge 418 of the actuation plate, and the distance between the axis of rotation of the lever 402 and the upper edge of the actual plate is at a minimum. This configuration relates to a condition in which the wheel 120 is raised from the ground, and the frame member lowered to the ground. As the lever 402 is rotated from the first configuration to the second configuration, the second region of the cam head 416 contacts the upper edge of the actuation plate and owing to the increased separation of the second region from the axis of rotation compared with the first region, causes the actuation plate to move downwards relative to the bracket 406, thereby lifting the frame member 201 off the ground. The assembly further comprises a locking system (not shown in the drawings) to lock the lever 402 into the first and second configuration.

FIGS. 10 *a* to *d* show an assembly 500 for lifting and transporting a football goal, the football goal having a number of frame members. A section of a frame member 502 is a hollow, generally cylindrical elongate body 504 having a rounded base 506 which in use as a goal contacts the ground and a recessed elongate longitudinally extending channel 508 in its upper surface 510 having a slide track 512 formed therein extending longitudinally along the length of the goal frame member 502.

The slide track comprises a slot 520 having two over hanging retaining lips 522, 524. The slide track is intended to receive net clips that have a lug which are shaped to facilitate insertion in to the slot but when rotated are capable of engaging the retaining lips 522, 524 to retain the net clip in situ.

The assembly 500 has a sleeve 600 having a body 602 and a longitudinal through going bore 604 complementarily shaped to receive a frame member of a goal and having on its upper inner surface a protrusion 606 complementarily shaped with respect to the channel 508 of the frame member 502 which is received therein. The protrusion prevents rotation of the sleeve when coupled to the frame member and ensures correct positioning and alignment of the assembly. The sleeve is secured in position by means of two fasteners that engage with the slide track via apertures 608, 610 disposed in the upper surface of the sleeve.

Moveably mounted on the sleeve is an elongate arm 514 to which a caster wheel, such as a 360° swivel castor, may be mounted at one end 516 and a handle at the other end 518. One end 516 has a planar square base mounted perpendicularly to the plane of the longitudinal axis of the arm 514 having four apertures disposed at its corners for receiving fasteners to secure a caster wheel thereto.

The assembly 500 further comprises a locking means 620 configured to lock the arm 514 relative to the sleeve 600. The locking means 620 may comprise a pin 622 configured to immobilise the arm 514 relative to the sleeve 600, whereby the pin 622 is insertable into an aperture 624 disposed within a first support positioned on the sleeve, and into an aperture 626 disposed within the second support positioned on the sleeve, and simultaneously into an aperture 628 located in the side wall of the elongate arm 514, when the apertures 624, 626 and 628 are aligned.

The arm 514 is pivotally mounted on the sleeve by means of a elongate shaft 530 disposed on the sleeve and extending perpendicularly to the longitudinal axis of the sleeve which cooperates with a complementarily shaped aperture 532 in the arm 514 proximal to the base 516. The elongate shaft has a free end terminating with a threaded section 534 for receiving a nut or other suitable fastener. The arm 514 is pivotable between a first configuration, in which the elongate arm 514 is orientated substantially horizontally, parallel to the longitudinal axis of the frame member to which the assembly is coupled, and a second configuration in which the elongate arm 514 is orientated substantially vertically, perpendicular to the longitudinal axis of the frame member to which the assembly is coupled.

In use, the arm 514 is rotatably mounted on the sleeve and arranged to pivot about the fulcrum 517 such that in the first configuration, a wheel 515 (see FIGS. 10 *c* and *d*) mounted on the base of one end 516 of the arm is positioned above a lower portion 650 of the frame member 502 for lowering the goal onto the ground, and in the second configuration, the wheel is positioned below the lower portion 650 of the frame member 502 for lifting and transporting the goal. The arm 514 is lockable in the second configuration using the locking means 620 for facilitating substantially horizontal movement of the goal relative to the ground.

The elongate arm 514 may further comprise a retractable or telescopically extending handle 518.

FIGS. 11 a and b show a slide 700 having a planar elongate rectangular body 702 having a downwardly depending, centrally disposed protrusion 704 that extends along its length and has a complimentarily shaped profile to the slide track 706 disposed in the frame member 708. The protrusion 704 extends substantially perpendicularly to the plane of the planar body 702 and has two laterally extending tongues 710, 712 that cooperate with overhanging lips 714, 716 of the slide track to retain the slide in the slide track.

Extending perpendicularly to the plane of the body 702 are two spaced apart through going bores 718, 720 each for receiving the shaft 722, 724 of a fastener 726, 728. An assembly can then be mounted onto the slide and secured thereto and in position on the frame member via fasteners.

The Following Statements are not the Claims but are Further Aspects of the Invention 1. A lifting and transporting assembly for lifting and transporting a goal frame, the assembly comprising:
   an elongate arm having a first end and second end;
   a wheel coupled with the elongate arm;
   a bracket for coupling the assembly with a frame member of the goal frame, the arm being pivotally coupled with the bracket about a fulcrum;
   wherein the arm is pivotable between:
   a first configuration, in which goal frame is lowered upon the ground, and a second configuration in which the goal frame is raised above the ground; and wherein, in use, the arm is arranged to pivot about the fulcrum such that in the first configuration, the wheel is positioned above a lower portion of the frame member for lowering the goal frame onto the ground, and in the second configuration, the wheel is positioned below the lower portion of the frame member for lifting and transporting the goal frame.
2. An assembly as stated in statement 1, additionally comprising a locking means configured to lock the arm relative to the bracket.
3. An assembly as stated in statement 2, wherein the arm is lockable in the second configuration using the locking means.
4. An assembly as stated in any of the preceding statements, wherein the elongate arm comprises a retractable handle.
5. An assembly as stated in statement 4, wherein the retractable handle comprises a proximal end and distal end, wherein the proximal end of the handle is pivotally coupled with the second end of the elongate arm.
6. An assembly as stated in statement 5, wherein, the retractable handle is pivotable between a storage configuration, in which the retractable handle extends substantially along the length of the elongate arm, and an operative configuration, in which the retractable handle extends along the longitudinal axis of the elongate arm and away therefrom.
7. An assembly as stated in any of the previous statements, wherein the wheel comprises a swivel caster wheel.
8. An assembly as stated in any of the previous statements, wherein the bracket is shaped so as to define a cavity adapted to receive the frame member.
9. An assembly as stated in statement 8, wherein the bracket comprises a rigid beam having a first wall coupled to a second wall so as to define an L-shaped cross-section of the beam, wherein the first wall is pivotally coupled to the side wall of the elongate arm, and the second wall is detachably couplable with the frame member.
10. An assembly as stated in statement 9, wherein the second wall comprises a male connector adapted to detachably couple with a female connector disposed along the frame member.
11. An assembly as stated in statement 9, wherein the second wall comprises a female connector adapted to detachably couple with a male connector disposed along the frame member.
12. An assembly as stated in any of the preceding statements 9 to 11, wherein the beam is arranged to receive the frame member.
13. An assembly as stated in any of the preceding statements, wherein the locking means comprises a pin insertable into an aperture located in the bracket and simultaneously into an aperture located in the side wall of the elongate arm when the aperture in the bracket and the aperture in the side wall of the arm are aligned.
14. An assembly as stated in statement 1, wherein the elongate arm comprises a lever.
15. An assembly as stated in statement 14, wherein the wheel is coupled to a second end of the lever and to the bracket.
16. An assembly as stated in statement 15, wherein the wheel is coupled to the lever by a coupler.
17. An assembly as stated in statement 16, wherein the coupler comprises a T-shaped appendage.
18. An assembly as stated in statement 1, wherein the elongate arm comprises a lever.
19. An assembly as stated in statement 18, further comprising an actuation plate coupled to said lever, wherein rotation of the lever induces linear movement of the actuation plate.
20. An assembly as stated in statement 19, wherein said linear movement is substantially vertical movement.
21. An assembly as stated in statement 19, wherein the lever is coupled to the first end of the actuation plate, and the wheel is coupled to the second end of the actuation plate.
22. A transportation system for transporting a goal frame, comprising a plurality of the assemblies as stated in any of the preceding statements.

The invention claimed is:

1. A lifting and transporting assembly for lifting and transporting sports equipment over a surface, the sports equipment having a frame comprising one or more frame members, the assembly comprising:
   an elongate arm pivotally mounted on a coupling member having a first end and second end, the coupling member for coupling the elongate arm with the frame member of the sports equipment, the arm being moveably mounted on the coupling member;
   a wheel coupled with the first end of the elongate arm;
   locking means configured to lock the arm relative to the coupling member; wherein the arm is moveable between:
   a first configuration wherein the elongate arm is orientated substantially horizontally and the wheel of the assembly is positioned above a lower portion of the frame member, such that the frame member is capable of being in contact with the surface, and a second configuration wherein the elongate arm is orientated substantially vertically and the wheel of the assembly is positioned below the lower portion of the frame member to lift the frame member off the surface; and
   wherein the coupling member comprises a sleeve shaped to define a cavity adapted to receive the frame member; and wherein the cavity within the sleeve is oriented substantially horizontally; and wherein the arm is lockable in the second configuration using the locking means.

2. An assembly according to claim 1, wherein the elongate arm comprises a retractable handle.

3. An assembly according to claim 2, wherein the retractable handle is telescopically or pivotally extended from a stored configuration.

4. An assembly according to claim 3, wherein, the retractable handle is pivotable between a stored configuration, in which the retractable handle extends substantially along the length of the elongate arm, and an operative configuration, in which the retractable handle extends along the longitudinal axis of the elongate arm and away therefrom.

5. An assembly according to claim 1, wherein the wheel comprises a swivel caster wheel.

6. An assembly as claimed in claim 1 wherein the cavity is an aperture extending therethrough for receiving the frame member.

7. An assembly as claimed in claim 6 wherein the aperture is complementarily shaped with respect to the frame member.

8. An assembly as claimed in claim 1, wherein the coupling member is releasably secured to the frame member.

9. An assembly as claimed in claim 1, wherein the coupling member comprises a slide received in a track disposed on a frame member.

10. An assembly as claimed in claim 9 wherein the slide comprises a planar body having a male connector extending therefrom to be received by female connector disposed in a frame member.

11. An assembly as claimed in claim 1, wherein the coupling member is releasably securable in a desired location on a frame member by means of securing means.

12. An assembly as claimed in claim 11 wherein the securing means comprises one or more securing members.

13. An assembly according to claim 1, wherein the locking means comprises a pin insertable into an aperture located in the coupling member and simultaneously into an aperture located in the side wall of the elongate arm when the aperture in the coupling member and the aperture in the side wall of the arm are aligned.

14. An assembly according to claim 1, wherein the sports equipment is a goal.

15. An assembly as claimed in claim 14 wherein the goal is for use in football, field hockey, lacrosse, handball, basketball, rugby or soccer.

16. A transportation system for transporting sports equipment, comprising a plurality of the assemblies according to claim 1.

* * * * *